United States Patent
Dusek

[15] 3,688,757
[45] Sept. 5, 1972

[54] COLLAPSIBLE BARBECUE GRILL

[72] Inventor: Henry F. Dusek, San Angelo, Tex. 76901

[73] Assignee: Owen J. Gray, San Angelo, Tex.

[22] Filed: May 12, 1971

[21] Appl. No.: 142,560

[52] U.S. Cl. .............................. 126/9 R, 126/25 A
[51] Int. Cl. .......... F24c 1/16, A47j 37/07, F24b 3/00
[58] Field of Search ...... 126/9 R, 25 R, 25 A, 9 B, 29

[56] References Cited

UNITED STATES PATENTS

| 2,058,836 | 10/1936 | Silver | 126/9 R |
| 2,597,477 | 10/1948 | Haislip | 126/9 R |
| 2,780,215 | 2/1957 | Vacanti | 126/25 A |
| 3,421,493 | 1/1969 | Miller | 126/25 R |
| 3,490,433 | 1/1970 | Busenbarrick | 126/9 R |
| 2,959,165 | 11/1960 | Mark | 126/9 R |

Primary Examiner—Charles J. Myhre
Assistant Examiner—James C. Yeung
Attorney—Mason, Fenwick & Lawrence

[57] ABSTRACT

A collapsible grill is disclosed having vertical leg members connected by horizontal brace members to which a heat source supporting plate, a grill and a pot supporting rod are connectable through slots on each of their ends to the horizontal brace members to prevent pivotal movement of these elements with respect to the brace members and their associated leg members; an additional feature includes the provision of alternate gas burner or electric heating element heat source means mountable on the heat source support plate with removable heat shield means being positioned adjacent the heat source support plate. The device is assembled without the need of any tools and is held in assembled condition by the weight of the components.

10 Claims, 8 Drawing Figures

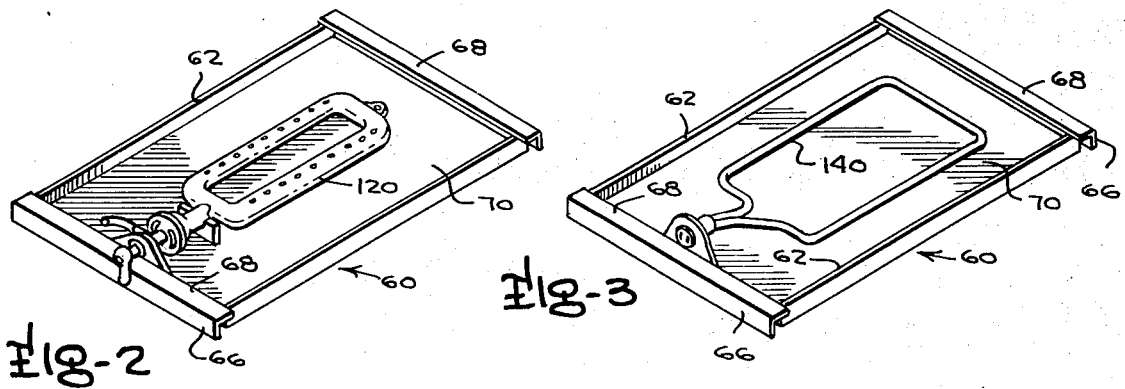
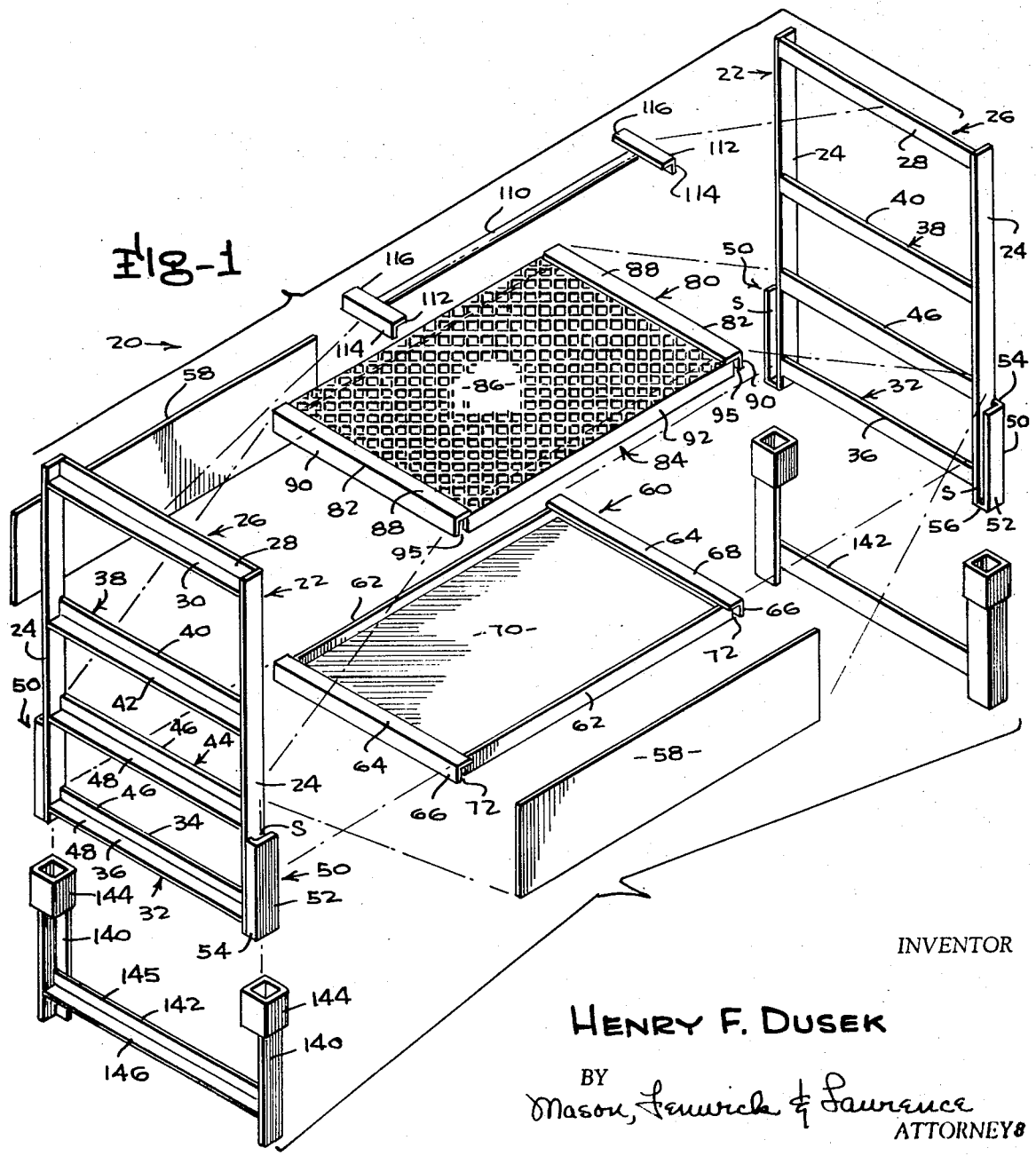

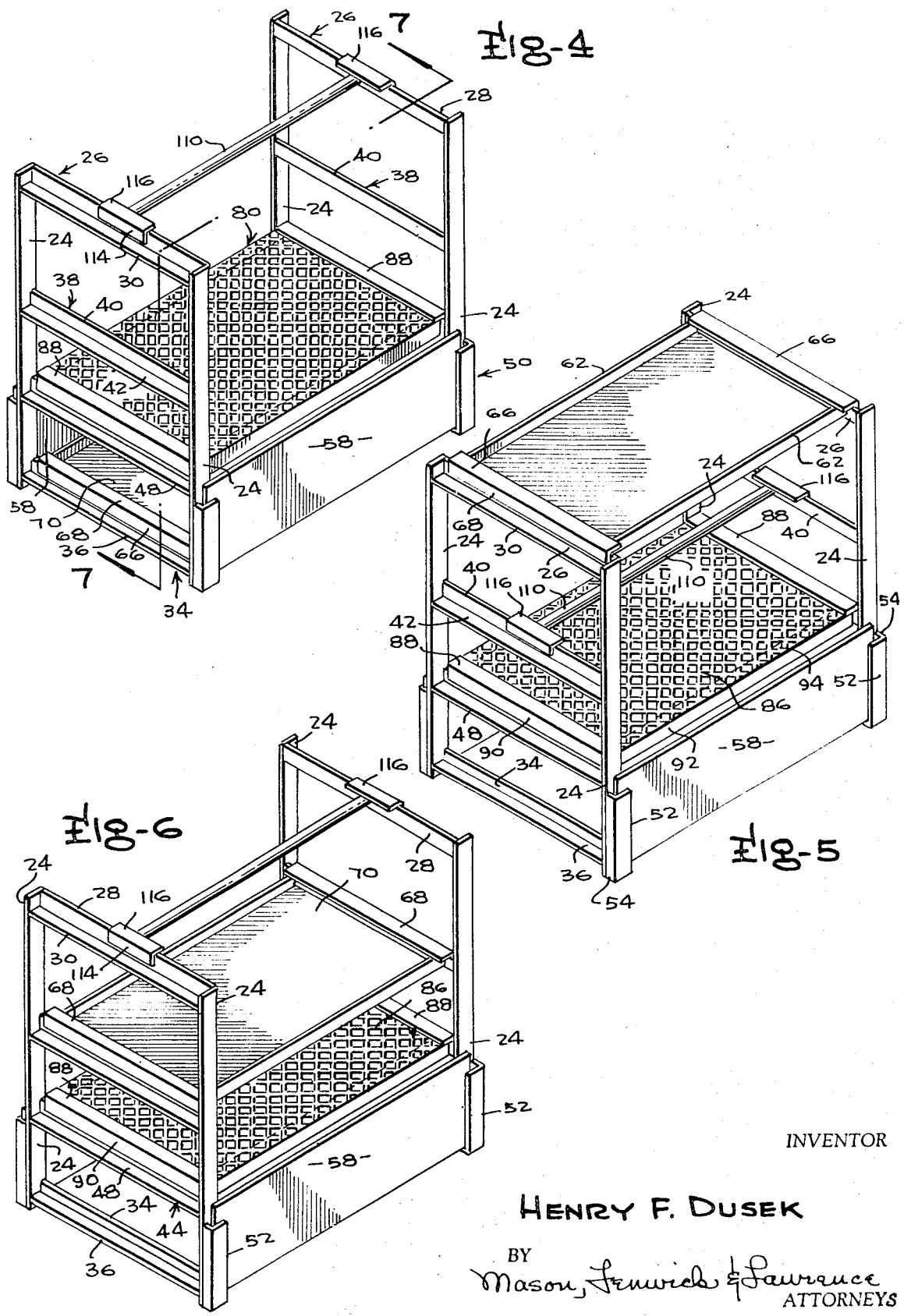

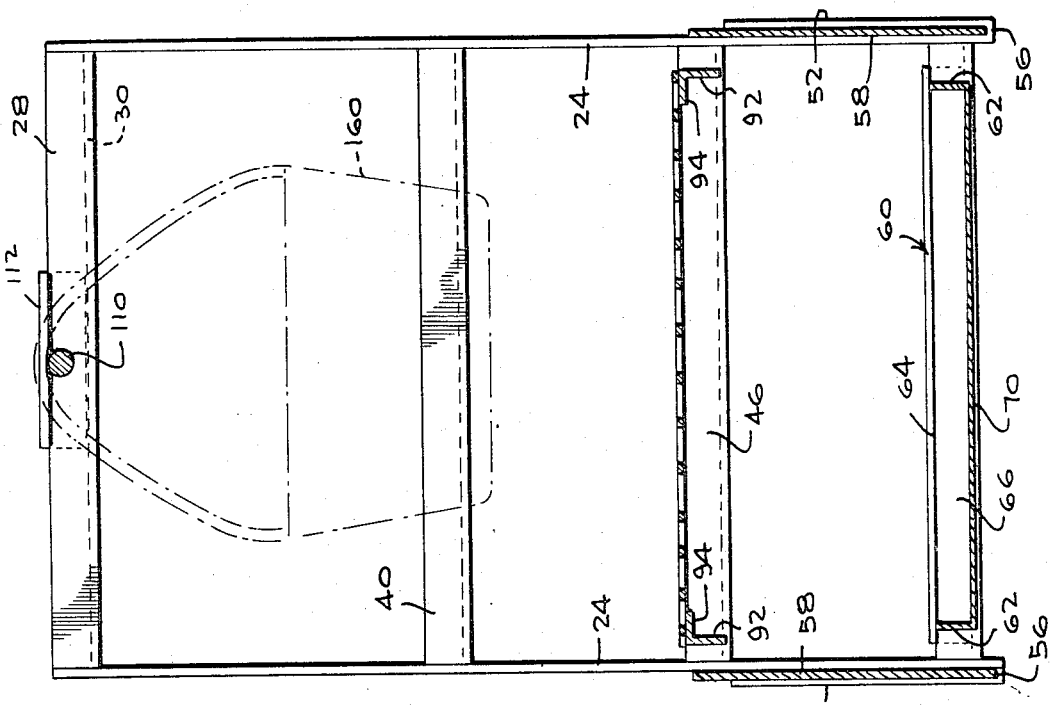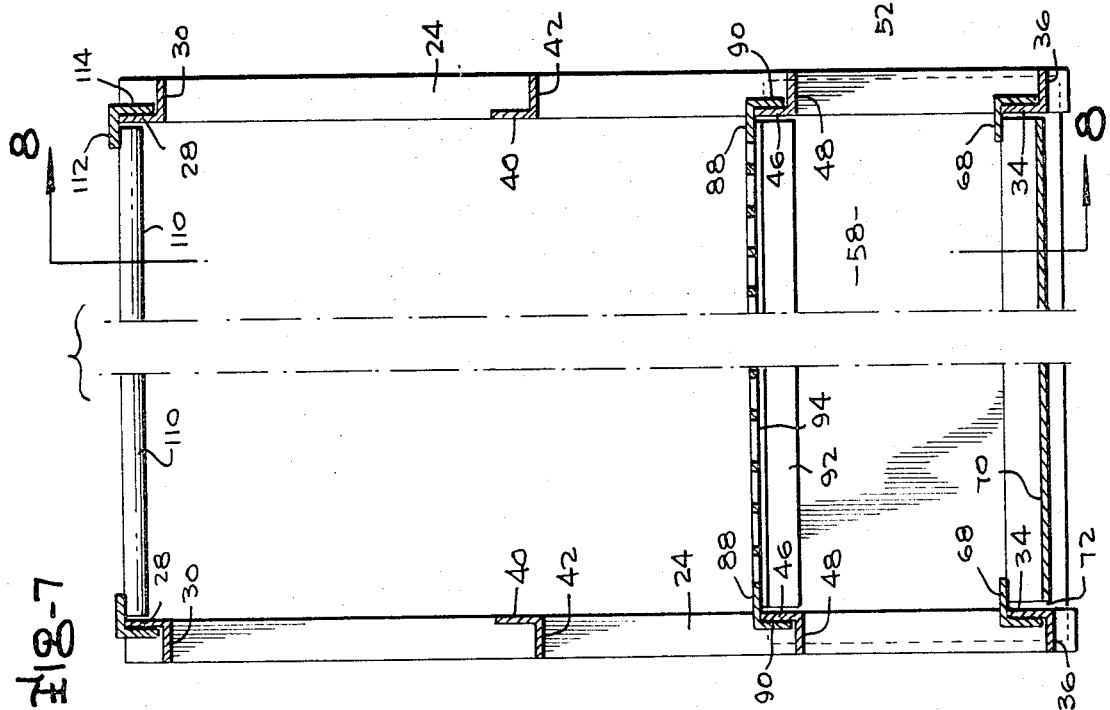

COLLAPSIBLE BARBECUE GRILL

This invention is in the field of cooking equipment and is specifically directed to a new and improved portable barbecue grill that is easily assembled, capable of versatile usage and is of rugged construction.

The field of outdoor cooking has enjoyed a great surge in popularity in recent years and as a consequence, a large variety of outdoor cooking equipment having various designs has evolved. Many of the prior known systems have been of collapsible construction and consequently have made a sacrifice in strength of construction in order that they may be folded to reduced dimensions for transportation before and after usage. Moreover, most of these prior known systems have been rather complicated and difficult to assemble and disassemble at the cooking site.

Additionally, the prior known devices have frequently been of complicated design requiring specially fabricated component parts and resulting in a consequently increase in initial cost.

Another shortcoming of the prior known devices is that they have been limited to outdoor usage in which combustible materials such as charcoal are employed for providing the necessary heat for cooking and have not been capable of indoor usage in areas having limited ventilation.

Notwithstanding all of the aforementioned deficiencies of the prior known portable grill devices, probably the greatest and most widespread deficiency is the fact that such devices are frequently of flimsy lightweight sheet metal construction highly susceptible to damage in the normal usage to which such devices are subjected.

Therefore, there has heretofore been an unmet need for a rugged, reliable and simple outdoor barbecue grill or cook stove which could be formed of conventional constructional elements and which would be easy to assemble and disassemble with no need for the usage of hand tools or the like. Additionally, there has been an unmet need for a reliable outdoor type cook stove which could easily be converted to indoor usage and which is capable of providing a grill for broiling meat and a support for a cook pot in which liquid stews, soups or the like could be cooked or maintained at a warm temperature. This invention meets these previously unmet needs.

Therefore, it is the primary object of this invention to provide a new and improved outdoor-indoor grill or cookstove.

Obtainment of the object of this invention is enabled through the provision of a barbecue grill construction formed of a pair of ladder members each having a plurality of horizontal brace members extending between a pair of vertical leg members. A fire-pan plate or heat source support plate is mounted on the lowermost horizontal brace members with a grill being mountable upon the ladder members by connection to intermediate ones of the brace members of each ladder. Additionally, a pot support rod is connected to the uppermost brace members for enabling the support of a kettle or the like above the heat source. All of the component parts attached to the ladder members are held in position on the horizontal brace members by the force of gravity and are connected to the brace members by mating slots so as to prevent pivotal movement of the ladder members with respect to each of the individual supported components. Consequently, a rugged construction is provided which can be easily assembled and disassembled.

Another feature of the subject invention resides in the provision of alternate heat source members in the form of a gas burner or an electric heating element support plate which can be attached to the ladder members for use of the grill in either interior or exterior locations having gas or electric power. These and other features of the subject invention will be readily understood when the following written description is considered in light of the attached drawings in which:

FIG. 1 is an exploded perspective view of the preferred embodiment;

FIG. 2 is a perspective view of a second embodiment component;

FIG. 3 is a perspective view of a third embodiment component;

FIG. 4 is a perspective view of the preferred embodiment assembled for one mode of operation;

FIG. 5 is a perspective view of the preferred embodiment assembled in a different manner for a second mode of operation;

FIG. 6 is a perspective view of the preferred embodiment assembled for a third mode of operation;

FIG. 7 is a sectional view taken along lines 7—7 of FIG. 4; and

FIG. 8 is a sectional view taken along lines 8—8 of FIG. 7.

Turning now to the preferred embodiment, attention is initially invited to FIG. 1 which illustrates the component parts of the preferred embodiment which is generally designated 20 and which includes a pair of identical ladder members 22 defining each end of the device and which provide support for the entire construction. Each ladder member 22 includes first and second vertical leg members 24 which provide the vertical extent and support of the referred embodiment. An upper horizontal brace member 26 formed of an angle member consisting of a vertical plate 28 and a horizontal plate 30 extends between the upper ends of the vertical leg members 24.

Similarly, a lower brace member 32 is connected across the lower end of legs 24 and includes a vertical plate 34 and a horizontal plate 36.

The middle portions of the vertical leg members 24 of each ladder 22 are connected by an upper intermediate brace member 38 formed of an angle member having a vertical plate 40 and a horizontal plate 42 and a lower intermediate brace 44 of an angle construction having a vertical plate 46 and a horizontal plate 48.

The lower ends of each of the legs 24 are provided with slot defining means comprising angle plates 50 each having a side portion 52 and an end portion 54 having a bottom plate 56 extending across their lowermost ends. The plates 52, 54 and 56 define a slot S adjacent each end of the legs 24 for receiving and supporting front and rear heat shield plates 58 in a manner to become apparent hereinafter.

A planar heat source supporting tray 60 is provided for support by the lower brace members 32 in a manner to be discussed. Tray 60 is of rectangular configuration and is formed with a pair of angle members 64 on each end each comprising an external vertical plate component 66 and a horizontal plate component 68. The end angle frame members 64 are welded to a unitary support plate comprising a planar portion 70 having front and rear edge plates 62 extending upwardly from its front and rear edges as best illustrated in FIG. 1. The ends of the planar portion 70 and rail plates 62 are spaced from the vertical plates 66 to provide a horizontally extending slot 72 along each end of the heat source supporting tray as shown in FIG. 1. The width of slots 72 is slightly more than the thickness of the vertical plates 34 over which slot 72 is designed to fit. Consequently, the tray 60 can be placed in position with the slot 72 being matingly received over the plates 34. The dimensions of the slots 72 and the vertical plate 74 are sufficiently the same so as to preclude pivotal movement of the heat source supporting tray 60 with respect to the respective ladder members 22 in an obvious manner. When positioned on the lower brace members 34 as shown in FIGS. 4, 7 and 8, the tray 60 is normally used for supporting a quantity of charcoal or the like to be burned to provide cooking heat.

A grill tray 80 is provided to be positioned above the heat source supporting tray 60 for supporting food being broiled. Tray 80 includes end angle rail members 82 and front and rear side angle rail members 84 to which are connected the edges of a metal grill 86. The end angle rail members 82 comprise a horizontal upper plate 88 and a vertical end plate 90; similarly, the front and rear angle rail members 84 comprise a vertical plate component 92 and a horizontal component plate 94.

The vertical component plates 90 of the end angle rail members 82 are spaced from the ends of the front and rear angle rail members 84 to define open slots 95 (FIG. 1) on each end of the grill tray to be receivable on the vertical plate components 46 etc. of the brace members in a manner exactly identical to the manner in which slots 72 of the previously discussed heat source supporting tray 60 are received on the vertical plate components 34.

A pot support rod 110 capable of supporting a large pot or kettle 160 is provided for support from the upper horizontal brace components of the ladder members 22. Rod 110 is welded at each end to angle members 112 each of which comprises a vertical plate component 114 and a horizontal plate component 116. The ends of rod 110 are spaced from the vertical plate components 114 to define a slot fittable over the vertical components 28 of the upper brace members 26 as best shown in FIG. 7. The dimensions of the aforementioned slot are such as to snugly embrace the vertical component plate 26 to resist pivotal movement of the rod with respect to the brace members( and vice versa) in an obvious manner.

Assembly of the preferred embodiment is easily enabled by merely positioning the heat source supporting tray 60, the grill tray 80 and the pot rod 110 on the two ladder members 22 to provide a sturdy trouble-free construction. The devices are held in place by the force of gravity and no tools are required for assembly. Moreover, the heat shield 58 is insertable on the front and rear sides of the grill to provide a shield both of the heat and a windshield for the plate of the heat source supporting tray. It should be noted that the shields 58 slide downwardly in the slots S to be positioned in the manner illustrated in FIGS. 4–6.

Moreover, FIG. 2 illustrates an alternative embodiment in which the heat source supporting tray 60 is provided with a gas burner assembly 120 to be used in place of a charcoal fire or the like. As another alternative, an electrical heating unit 140 can be provided on the tray 60 in the manner illustrated in FIG. 3.

For normal operation, the heat source supporting tray 60 is positioned on the lower brace members 34 in the position shown in FIG. 4. The grill tray 80 is positioned on the vertical plates 46 of the lower intermediate brace members 44 immediately above the heat source supporting tray 60 and the pot support rod 110 is supported by the upper brace members 26 as shown.

However, the subject invention is extremely versatile in that the grill can be supported upon the upper intermediate brace members 38 to provide an additional spacing from the source of heat on the lower plates 70 if desired.

Additionally, the preferred embodiment can be employed as a table or stand by positioning the heat source supporting tray 60 on either the upper brace members 26 or the uppermost intermediate brace members 38 as respectively shown in FIGS. 5 and 6 of the drawings. Moreover, an identical tray identical to tray 60 could be positioned in place of the grill tray if it should be desired to provide a large cooking surface or supporting a plurality of cooking vessels or for providing a frying surface.

Additionally, if it should be desired to provide greater height for the preferred embodiment, booster legs 140 (FIG. 1) each connected by a horizontal brace member 142 can be employed. The upper ends of the booster legs 140 are provided with square sockets 144 dimensioned to receive the lower ends of the legs 24 and their associated angle plate members 50 in an obvious manner. Moreover, the angle brace 142 is provided with a vertical plate 145 and a horizontal plate 146 with the vertical plate 145 being dimensioned to receive and support the various tray components in the same manner as the previously discussed plates 26, 32, 44 and 38.

It will be obvious that the subject invention is easily assembled and disassembled and can be stored in an extremely small place due to the fact that all of the components are essentially of flat configuration and can be placed in overlying relationship to each other so as to occupy an extremely small amount of room. Moreover, the employment of conventional angle iron elements for the brace members etc. provides a substantial savings in cost.

Many variations will occur to those skilled in the art; however, it should be understood that the subject invention should be limited solely in light of the appended claims.

I claim:

1. A portable barbecue grill comprising first and second elongated aligned vertically extending ladder members each comprising a pair of vertical legs connected by an upper horizontal brace member, a lower horizontal brace member, and a pair of parallel intermediate brace members, said brace members of each ladder being horizontally aligned with like members of the other ladder, a horizontal heat source support plate extending between said lower horizontal brace members, connector means on each end of said heat source plate matingly engageable with said lower brace members and held in position gravitationally for preventing pivotal movement of said ladder members with respect to said heat source support plate, an elongated grill member extending between aligned intermediate brace members of said ladder members above said heat source plate, connector means on each end of said elongated grill member matingly engageable with the aligned intermediate brace members on which said grill member is mounted for preventing pivotal movement of said ladder members with respect to said grill member, a pot hanging rod having connector means on each end engageable with said upper horizontal brace members for supporting said rod and preventing pivotal movement of said ladder members with respect to said pot hanging rod.

2. The invention of claim 1 additionally including slot providing means on each of said vertical legs and heat shield side plates removably inserted in said slot providing means for positioning adjacent the heat source support plate.

3. The invention of claim 2 wherein said heat source support plate is a planar plate member on the upper surface of which a combustion process is supported.

4. The invention of claim 3 including heat providing means comprising a gas burner supported on said heat source support plate.

5. The invention of claim 1 including heat providing means comprising an electric heating element supported on said heat source support plate.

6. The invention of claim 2 additionally including extension leg members each having a socket attached to its upper end for receiving the lower ends of said vertical leg members to raise the height of said barbecue grill and extension leg brace members connecting said extension leg members.

7. The invention of claim 1 wherein said heat source support plate is a planar plate member on the upper surface of which a combustion process is supported.

8. The invention of claim 7 including heat providing means comprising a gas burner supported on said heat source support plate.

9. The invention of claim 7 additionally including extension leg members each having a socket attached to its upper end for receiving the lower ends of said vertical leg members to raise the height of said barbecue grill and extension leg brace members connecting said extension leg members.

10. The invention of claim 1 additionally including extension leg members each having a socket attached to its upper end for receiving the lower ends of said vertical leg members to raise the height of said barbecue grill and extension leg brace members connecting said extension leg members.

* * * * *